United States Patent

[11] 3,555,262

[72] Inventor Shoichi Shimada
Kyoto, Japan

[21] Appl. No. 727,191
[22] Filed May 7, 1968
[45] Patented Jan. 12, 1971

[73] Assignee Dainippon Screen Seizo Kabushiki Kaisha
(Dainippon Screen Manufacturing Company, Limited)
Kyoto, Japan

[54] APPARATUS FOR PRODUCTION OF COLOR SEPARATION RECORDS
5 Claims, 3 Drawing Figs.

[52] U.S. Cl. .... 235/193, 178/5.2
[51] Int. Cl. .... H04n 1/46, G06g 7/00
[50] Field of Search .... 101/(Inquired); 178/5.2, 5.4; 235/184, 193, 151.22, 151.35; 355/(Inquired); 356/(Inquired)

[56] References Cited

UNITED STATES PATENTS

| | | | |
|---|---|---|---|
| 2,965,703 | 12/1960 | Loughlin | 235/193 |
| 3,060,790 | 10/1962 | Ward | 235/193UX |
| 3,233,087 | 2/1966 | Faulhaber et al. | 235/193 |

*Primary Examiner*—Malcolm A. Morrison
*Assistant Examiner*—Joseph F. Ruggiero
*Attorney*—Jacobi, Davidson, Filling & Siegel

ABSTRACT: Color separation records are produced which are necessary to produce printers for printing color images by scanning an original copy. More particularly, printers are produced for reproducing color images with the use of color inks other than the standard inks. Black ink is used for the separation of color to substitute for the neutral color which is normally obtained by printing the standard three color inks one over the other.

INVENTOR
Shoichi Shimada

BY Jacobi & Davidson

ATTORNEYS

APPARATUS FOR PRODUCTION OF COLOR SEPARATION RECORDS

This invention relates to apparatus for the production of color separation records which are necessary to produce printers for printing color images by scanning an original copy, and the invention relates more particularly to apparatus for producing the color separation records necessary to reproduce color images by the combination of printing inks of optional hue.

In conventional printing processes, three color inks of subtractive primary color components yellow, magenta, and cyan and an additional black ink are used to reproduce color images. The apparatus for the separation of color adapted to perform the above processes are well-known. These three color inks and black ink will be hereinafter called as standard inks.

This invention has for its object to provide the apparatus for producing the printers for reproducing color images with the use of color inks other than the standard inks, for example, green, orange, violet and intermediate colors thereof which are produced only by printing two or more colors one over the other in the conventional process. The inks of such color of green, orange, violet and intermediate colors thereof will be hereinafter called as special color inks. Such the special color inks are demanded frequently for the printing of color images which are difficult to produce by the combination of the standard inks. Such the special color inks are desirable for the printing of large scale with a predetermined color. In calio printing, such the special inks are used very frequently. However, the printers for such special color inks are obtainable only by very complicated hand works.

It is another object of the present invention to provide a new and improved apparatus for the separation of color to substitute the neutral color which is normally obtained by printing the standard three color inks one over the other, completely by a black ink. In accordance with the invention, the part of neutral color of an original copy is reproduced by a black ink only, not by the overprinting of color inks.

It is still another object of the present invention to provide a new and improved apparatus for the separation of color to substitute the combination of the standard inks, for example the printing of a standard yellow ink over a cyan ink for producing green, by a green ink. In accordance with the invention, the green part of an original color copy is reproduced by a green ink only, not by the combination of yellow and cyan inks.

For a better understanding of the present invention together with other and further objects thereof, reference is had to the following description taken in connection with the accompanying drawings, in which.

Before describing the apparatus embodying the invention, it is believed that it would be helpful to give an explanation of the principles underlying the invention.

Figure 1:
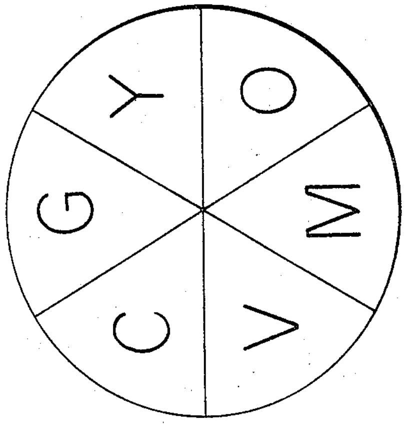
FIG. 1 is a hue circle for the explanation of the fundamental idea of the invention.

The printing inks are variety of hue and density. If an apparatus for color correction is provided individually for each ink, the machine must become a huge one. Therefore, the inventor has taken an idea to use six color inks and a black ink. As illustrated in the hue circle of FIG. 1, the inks used in the present invention are yellow (Y), orange (O), magenta (M), violet (V), cyan (C) and green (G). The black ink which is also used in the invention, will be hereinafter referred to as (K). In the present invention, the basic inks are preselected to reproduce color images by a set of six color inks individually representative of the above-mentioned six colors and by the black ink representative of the neutral factor. In the printing process of the invention, a basic computation is carried out to reproduce color images by these basic six color inks and black ink. The signals which have been obtained by the basic computation, are suitably added or subtracted by the special color computation followed to the basic computation so as to obtain a signal adapted to select the ink suitable to reproduce the original color image. In the present invention, a system for under color removal is further provided to perform the computation necessary to substitute the combination of color inks by the special color inks, as previously described, and by neutral ink or the black ink.

Figure 2:
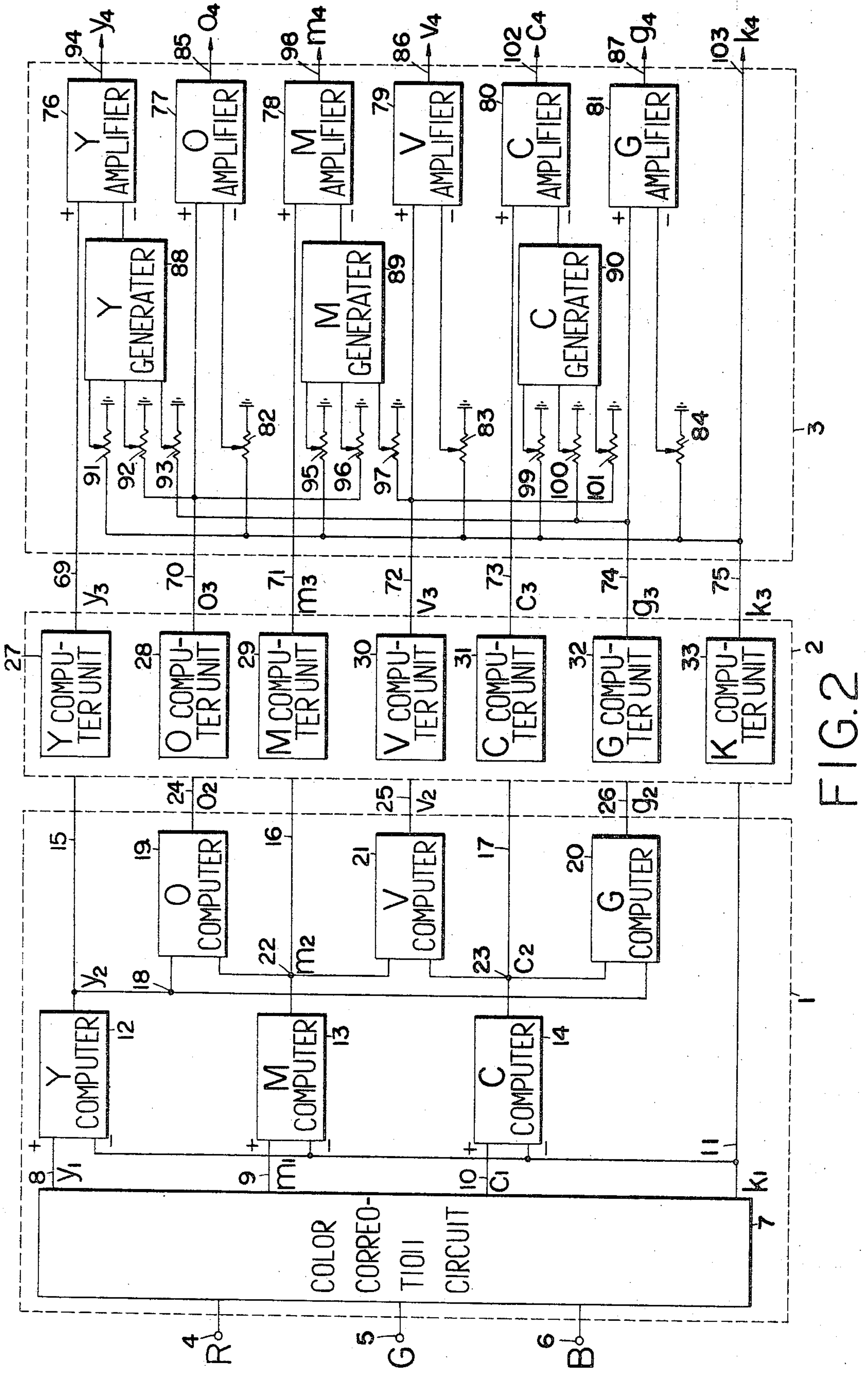
FIG. 2 is a diagram showing the system of the invention.

Referring now to FIG. 2, there is represented an apparatus for processing the printing in accordance with the invention with the use of the above-mentioned basic six color inks and black ink to reproduce the original color images. The apparatus consists generally of three parts, basic computation circuit 1, special color computation circuit 2, and under-color removal circuit 3. Conventional color separation apparatus are employed to develop signals representative of the additive primary color components red (R), green (G) and blue (B). The apparatus of the invention includes input terminals 4, 5 and 6 for supplying signals representative of the R, G, and B color components of the original image by scanning the original color copy. The signals representative of the R, G and B color components of the scanned copy are applied to a color correction circuit means 7 which develops ink signals $y_1$ $m_1$, $c_1$, and $k_1$. corresponding to the basic inks representative of yellow, magenta, cyan and black. These ink signals are supplied to output leads 8, 9, 10 and 11.

Four signals $y_1$, $m_1$, $c_1$, and $k_1$, from leads 8, 9, 10 and 11, respectively, represent the amount of inks necessary to reproduce the original color images by the four colors Y, M, C and K. These basic inks may be of the standard inks normally used in four-color printing. Thus, the circuit 7 may be of the color correction circuit of conventional apparatus for the separation of color.

The magnitude of signals $y_1$, $m_1$, $c_1$, and $k_1$, is determined, when the original copies are of the solid patches of the basic inks Y, M, C and K, as follows:

$$\begin{aligned} y_1&=1 \text{ (Y, K)}\\ m_1&=1 \text{ (M, K)}\\ c_1&=1 \text{ (C, K)}\\ k_1&=1 \text{ (K)}\\ y_1&=0 \text{ (M, C, white)}\\ m_1&=0 \text{ (Y, C, white)}\\ c_1&=0 \text{ (Y, M, white)}\\ k_1&=0 \text{ (Y, M, C, white).} \end{aligned}$$

The signals $y_1$, $m_1$, and $c_1$, are applied to yellow color computer, magenta color computer and cyan color computer, respectively. These color computers are of differential amplifiers. As shown in FIG. 2, the lead 8 of signal $y_1$, connects to (+) input terminal of the yellow color computer, of Y computer 12. Similarly, the lead 9 of signal $m_1$, connects to (+) input terminal of the magenta color computer, or M computer 13; and the lead 10 of signal $c_1$, to (+) input terminal of the cyan color computer, or C computer 14. The (+) input of the respective color computer is the additive input in the differential amplifier. Supplied to the (−) input terminal as the subtractive input of the differential amplifier of the respective color computer through lead 11, is the signal $k_1$, which represents the neutral factor of the original color copy. Thus, the difference of two input signals appears at the output terminal of the respective color computer. The color computers operate to compute the amount of neutral component which may be represented by the black ink in substitution for the color inks to be used in four-color printing. In the computers, the amount of black ink is subtracted from the amount of color ink for obtaining the color components only. The corrected color-separation signals $y_2$ $m_2$ and $c_2$ of color components Y, M and C may be represented by the following equations:

$$\begin{aligned} y_2&=y_1-k_1\\ m_2&=m_1-k_1\\ c_2&=c_1-k_1 \end{aligned} \quad (1)$$

The corrected signals $y_2$, $m_2$ and $c_2$ are supplied to output leads 15, 16 and 17, respectively. Generally, the minimum amount of $y_1$, $m_1$, and $c_1$, are considered the amount of neutral component and correspond to $k_1$. Therefore, at a moment of scanning, any one of $y_2$, $m_2$ and $c_2$ will be zero.

Now supposition is made to provide a basic orange ink having the same color factor with that of obtained on a solid patch produced by printing the basic yellow ink over the basic magenta ink. Similarly, basic violet and green inks are provided by overprinting of the magenta and cyan inks and of the cyan and yellow inks, respectively. These color inks will be hereinafter called as secondary color basic inks.

In case an intermediate color is produced by the overprinting of the standard primary color inks, the above-mentioned secondary color basic ink may be used as a substitute for the smaller part of the primary color ink for overprinting. For instance, when Y and M inks are overprinted to certain amount with respect to each other, a certain amount of the overprinted inks may be substituted by the secondary color basic ink of orange. The amount of substitution by orange ink depends upon the amount of Y or M inks which is smaller than the other relatively.

Now referring again to FIG. 2, the color component signals $y_2$, $m_2$ and $c_2$ from the primary color computers 12, 13, and 14 are supplied to the special color computation circuit 2 through leads 15, 16 and 17, respectively, and at the same time these signals are applied to the secondary color computers included in the basic computation circuit 1.

The lead 15 of signal $y_2$ connects with a common terminal 18 for supplying this signal to a 0 computer 19 and a G computer 20. Similarly, the lead 16 of signal $m_2$ connects with the 0 computer 19 and a V computer 21 through a common terminal 22; and the signal $c_2$ is supplied to the V computer 21 and G computer 20 through a common terminal 23 of lead 17.

The secondary color computers include a minimum value selection circuit, respectively, which derives the smaller part of signals from the signals applied thereto. After computation by computers 19, 21 and 20, the signals of orange component $o_2$, violet component $v_2$ and green component $g_2$ are supplied to the special color computation circuit 2 through leads 24, 25 and 26, respectively. A conventional circuit with diode device may be utilized for the minimum value selection circuit.

A portion of the output signal $k_1$ from the color correction circuit 7 is fed to the special color computation circuit 2 through lead 11.

The signals $o_2$, $v_2$ and $g_2$ may be represented as:

$$\begin{aligned} o_2 &= \text{MIN. } (y_2 \text{ or } m_2) \\ v_2 &= \text{MIN. } (m_2 \text{ or } c_2) \\ g_2 &= \text{MIN. } (c_2 \text{ or } y_2) \end{aligned} \qquad (2)$$

respectively.

The magnitude of signals $y_2$, $m_2$ $c_2$, $o_2$, $v_2$, $g_2$ and $k_1$ can be written as follows, when the original copies are of the solid patches of the basic inks Y, M, C, O, V, G and K:

| | |
|---|---|
| $y_2=1$ (Y, O, G) | $y_2=0$ (white, K, M, V, C) |
| $m_2=1$ (M, V, O) | $m_2=0$ (white, K, C, G, Y) |
| $c_2=1$ (C, G, V) | $c_2=0$ (white, K, Y, O, M) |
| $o_2=1$ (O) | $o_2=0$ (except O) |
| $v_2=1$ (V) | $v_2=0$ (except V) |
| $g_2=1$ (G) | $g_2=0$ (except G) |
| $k_1=1$ (K) | $k_1=0$ (except K). |

Again, before describing the special color computation circuit 2, it is believed that it would be helpful to give a brief mathematical explanation of the derivation of the basic relationships that should be satisfied. In the color signals (except the signal $k_1$) which have been derived from the basic computation circuit 1 of the invention, there is included no neutral component. In the conventional printing process, neutral component is represented by color inks. When consideration is given to the case of necessity to represent the neutral component by color inks and to derive a signal corresponding to the amount of ink from the above color signals, the neutral component $k_1$ must be added thereto. This relationship may be represented by the following formula:

$$x_3 = x_2 + k_1 \qquad (3)$$

where $x_2$ is the color component signal derived from the basic computation circuit; $x_3$ is the special color signal derived from the special color computation circuit. The $x$ is represented to be replaced with $y$, $m$, $c$, $o$, $v$, and $g$.

Assumed that a cyan ink reddish than the standard cyan ink is used actually for reproduction. In the original copy of solid patch with this assumed ink and when signals, $y_1=0$, $m_1=0.1$, $c_1=0.8$, $k_1=0$ are obtained, the special color signals should be derived from the special color computation as follows:

$$y_3 = m_3 = 0 \text{ and } c_3 = 1.$$

In order to obtain the above signals, signal $c_1$ should be corrected by signal $c_2$. This may be corrected as:

$$\begin{aligned} m_3 &= k_1 + m_2 - \tfrac{1}{8}\, c_2 = 0 + 0.1 - \tfrac{1}{8} \times 0.8 = 0 \\ c_3 &= k_1 + c_2 + \tfrac{1}{4}\, c_2 = 0 - 0.8 + \tfrac{1}{4} \times 0.8 = 1 \end{aligned}$$

When a reddish yellow ink is used, the signal $m_2$ will necessarily have a certain value with respect to a yellow ink patch. Thus, the said value must be removed by applying the signal $y_2$ thereto. The above relationships are common to all the inks for the respective ink patch. Thus, the relationships may be written generally the following equations:

$$\begin{aligned} x_3 &= k_1 + x_2 \pm \Delta y_2 \pm \Delta m_2 \pm \Delta c_2 \pm \Delta o_2 \pm \Delta v_2 \pm \Delta g_2 \\ k_2 &= k_1 \pm \Delta y_2 \pm \Delta m_2 \pm \Delta c_2 \pm \Delta o_2 \pm \Delta v_2 \pm \Delta g_2 \end{aligned} \qquad (4)$$

where $x=y$, $m$, $c$, $o$, $v$, or $g$; and $\pm\Delta y_2$ means to add or subtract a suitable value of $y_2$ signal by the range between 0 percent and 100 percent thereof. Equation (4) gives the general computation carried out by the special color computation circuit 2.

Figure 3:
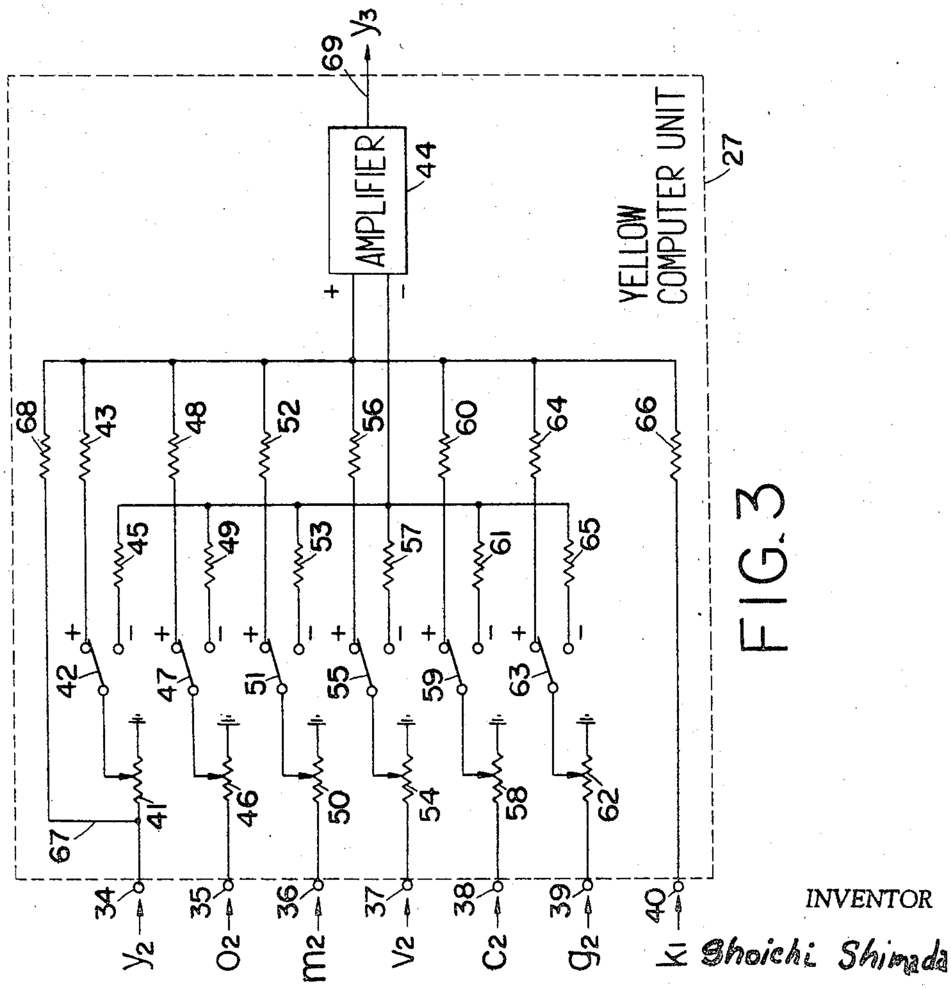
FIG. 3 is a circuit employed in the system of FIG. 2.

Referring again to FIG. 2, the special color computation circuit 2 comprises seven special color computer units Y computer 27 for the special computation of yellow, 0 computer unit 28 for orange, M computer unit 29 for magenta, V computer unit 30 for violet, C computer unit 31 for cyan, G computer unit 32 for green, and K computer unit 33 for black. The signals $y_2$, $o_2$, $m_2$, $v_2$, $c_2$, $g_2$ and $k_1$ from the basic computation circuit 1 are applied to each special color computer unit in the special color computation circuit 2 through the leads 15, 24, 16, 25, 17, 26 and 11, respectively. Only the Y computer unit 27 which carries out the special color computation for yellow, is shown in FIG. 3 in detail since the units for the other color have the identical circuit configurations for the special color computation of the respective color.

The yellow computer unit 27 consists of input terminals 34, 35, 36, 37, 38, 39, and 40 for signals $y_2$, $o_2$, $m_2$, $v_2$, $c_2$, $g_2$, and $k_1$, respectively. The input terminal 34 connects with a potentiometer 41, a changeover switch 42, an additive resistor 43 for supplying the signal $y_2$ to (+) input terminal of a differential amplifier 44. The signal $y_2$ is also supplied to (−) input terminal of amplifier 44 through an additive resistor 45 by operating the switch 42. Similarly, the input terminal 35 for signal $o_2$ is connected with the amplifier 44 at (+) input terminal thereof through a potentiometer 46, a switch 47 and a resistor 48, and at (−) input terminal of amplifier 44 via potentiometer 46, switch 47 and a resistor 49. Reference numerals 50, 51, 52 and 53 are the potentiometer, switch and resistors, respectively, for the connection of input terminal 36 with the amplifier 44 for supplying the signal $m_2$ thereto in the same manner as mentioned above. Likewise the signal $v_2$ is supplied to the amplifier 44 through a potentiometer 54, a switch 55 and resistors 56 and 57 from the input terminal 37; the signal $c_2$ is supplied through a potentiometer 58, a switch 59 and resistors 60 and 61; and the signal $g_2$ is through a potentiometer 62, a switch 63 and resistors 64 and 65, by the respective switching operation. The signal $k_1$ is applied to the (+) input terminal of amplifier 44 through an additive resistor 66. The (+) input terminal of amplifier 44 denotes the additive input in the differential amplifier; and the (−) terminal is the subtractive input in the amplifier. It should be noted that the yellow signal $y_2$ is supplied directly further to the (+) input terminal of amplifier 44 through a bypass 67 and an additive resistor 68.

The other color computer units 28, 29, 30, 31 and 32 are composed of the same circuit configuration as set forth in the unit 27, provided that the bypass is provided for supplying directly a portion of the signal of same color given to the respective color computer units, e.g., $o_2$ signal partly directly to the (+) input terminal of the differential amplifier in 0 computer unit 28, $m_2$ signal being bypassed as the (+) input of the amplifier in M computer unit 29, etc. It should be understood from the equation (4) that the circuit of K computer unit 33 has not such the bypass to supply directly a special color signal to the differential amplifier in said circuit.

Referring again to FIG. 3, depending upon the position of the adjustable contact of potentiometer 41, a portion of signal $y_2$ or signal $\Delta y_2$ is derived therefrom and is applied to switch 42. When the switch 42 is closed to connect with the (+) input terminal of amplifier 44 through resistor 43, the signal $\Delta y_2$ is supplied to the additive input of amplifier 44 to operate the computation of $+\Delta y_2$. On the contrary, when the switch 42 is turned to connect with the (−) input terminal of amplifier 44 through resistor 45, the signal $\Delta y_2$ is supplied to the subtractive input of amplifier 44 to operate the computation of $-\Delta y_2$. Similarly, the orange color component signal $o_2$ is applied to the potentiometer 46. Depending upon the position of the adjustable contact of potentiometer 46, the signal $\Delta o_2$ is derived therefrom and is supplied to the switch 47. In accordance with the operation of switch 47, the signal $\Delta o_2$ is supplied to the differential amplifier 44 either of additive input or subtractive input thereto. The signals of the other color components $m_2$, $v_2$, $c_2$ and $g_2$ are also applied to the same amplifier 44 in the same manner as described above so as to treat these signals in the yellow computer unit 27.

As described above, equation (4) is effected in the yellow computer unit 27 to develop the signal for special yellow as follows:

$$y_3 = k_1 + y_2 \pm \Delta y_2 \pm \Delta m_2 \pm \Delta c_2 \pm \Delta o_2 \pm \Delta v_2 \pm \Delta g_2.$$

Thus the differential signal is amplified in the amplifier 44 to develop signal $y_3$ for special yellow, then the signal $y_3$ appears the output lead 69 of amplifier 44. Similarly, the computer units for the other color 28, 29, 30, 31, and 32 and unit 33 develop the respective special color signals $o_3$, $m_3$ $v_3$, $c_3$, $g_3$ and $k$·

The special color computation circuit 2 has seven output terminals, as illustrated in FIG. 2, for deriving special color signals $y_3$, $o_3$, $m_3$, $v_3$, $c_3$, $g_3$, and $k_2$ therefrom through leads 69, 70, 71, 72, 73, 74, and 75, respectively. These special color signals are then supplied to the under-color removal circuit 3. The magnitude of these signals are determined as mentioned in the following Table 1.

TABLE 1

| | Patches of used inks | | | | | | | |
|---|---|---|---|---|---|---|---|---|
| | Y | O | M | V | C | G | K | White |
| Special color signals: | | | | | | | | |
| $y_3$ | 1 | 1 | 0 | 0 | 0 | 1 | 1 | 0 |
| $o_3$ | 0 | 1 | 0 | 0 | 0 | 0 | 1 | 0 |
| $m_3$ | 0 | 1 | 1 | 1 | 0 | 0 | 1 | 0 |
| $v_3$ | 0 | 0 | 0 | 1 | 0 | 0 | 1 | 0 |
| $c_3$ | 0 | 0 | 0 | 1 | 1 | 1 | 1 | 0 |
| $g_3$ | 0 | 0 | 0 | 0 | 0 | 1 | 1 | 0 |
| $k_2$ | 0 | 0 | 0 | 0 | 0 | 0 | 1 | 0 |

where the patches of used inks are the patches which are produced by printing, in solid, the ink used actually for reproduction; and the figures represent the amount of signals to be obtained from such the solid patches.

In the conventional four-color printing process, the color inks which are applied to the neutral part of original copy are not always substituted by black ink, but the substitution of ink is often carried out in the process. Such the substitution is called under-color removal. The present invention has an important object to realize 100 percent of under-color removal. The invention has another important object to make possible the reproduction of the special color part of original copy with the special color ink. According to the invention, for example, the orange dot area of the original color copy is reproduced by the orange ink only, not by the overprinting of yellow and magenta inks.

As will be understood from the Table 1, the signals which have been derived from the special color computation circuit 2, are not treated with such substitution or under-color removal. In order to perform such the substitution, there is provided the under-color removal circuit 3 in the apparatus of the invention. The relationships of under-color removal are written as under:

1. Secondary color inks O, G, and V may be substituted by black ink.
2. Primary color inks Y, M, and C may be substituted by black ink or by two kinds of the secondary color inks which are shown as adjacent to each other in the hue circle of FIG. 1 among the secondary color inks of O, G, and V.

Referring again to FIG. 2, the signals $y_3$, $o_3$, $m_3$, $v_3$, $c_3$, $g_3$, and $k_2$ are applied to the under-color removal circuit 3 through leads 69, 70, 71, 72, 73, 74, and 75, respectively. The under-color removal circuit 3 include six amplifiers 76, 77, 78, 79, 80 and 81, each effective to amplify the special color signals $y_3$, $o_3$, $m_3$, $v_3$ $c_3$ and $g_3$ derived from the special color computation circuit 2 to develop signal $y_4$, $o_4$, $m_4$, $v_4$, $c_4$ and $g_4$ for utilization in producing six color separation printers. The amplifiers 76, 77, 78, 79, 80, and 81 are of differential amplifiers. The signals $y_3$, $o_3$, $m_3$, $v_3$, and $g_3$ are supplied to the (+) input terminal of the respective differential amplifier.

As described above, the secondary color inks may be substituted by black ink. Thus the apparatus of the invention includes a plurality of circuit means, each effective to derive a signal representative of an amount of black ink which may be used in substitution for secondary color orange, violet, and green inks. As illustrated in FIG. 2, these circuit means may be in the form of a plurality of potentiometers 82, 83 and 84, individually coupled its (+) terminal to the lead 75 of signal $k_2$ and its adjustable contact connected with the (−) input terminal of the amplifier of the respective color. For example, the special color signal for orange $o_3$ is supplied to the (+) input terminal of O amplifier 77 as the additive input thereof through lead 70, while the special signal for neutral factor $k_2$ is supplied to the (−) input terminal of the same 0 amplifier 77 as the subtractive input thereof through $o_8$2. Depending upon the position of the adjustable contact of potentiometer 82, a portion of signal $k_2$ is supplied to the amplifier 82 as the subtractive input thereof so that the difference signal appears at the output lead 85 of amplifier 77 as signal $o_4$. value of signal $o_4$ may be determined by the following equation:

$$o_4 = o_3 - U_{ok} k_2$$

where $U_{ok}$ refers to an optional value of which is $O \leqq U_{ok} \leqq 1$ which is determined by the position of the adjustable contact of potentiometer 82. When the coefficient $U_{ok}$=0, no under-color removal is taken place. When the coefficient $U_{ok}$=1, 100 percent of under-color removal is effected.

In the same manner as described above referring to the orange signal, the operation of under-color removal for violet and green are set forth by the circuit means of V amplifier 79 and potentiometer 83 and the circuit means of G amplifier 81 and potentiometer 84, respectively. Thus, the signals $v_4$ and $g_4$ which have been developed by under-color removal operation, will appear the output lead 86 of V amplifier 79 and the output lead 87 of G amplifier 81, respectively.

In order to effect the under-color removal for yellow, magenta and cyan inks, there must be three operation of under-color removal, i. e., by black ink and by two kinds of secondary colors. Thus the apparatus comprises of three signal generators 88, 89 and 90 for the under-color removal of the primary color inks, each having three potentiometers for receiving the signal of neutral factor and the signals of the other two special colors derived from the special color computation circuit 2. The apparatus will now be described in detail for developing the under-color removal signal for the yellow channel only since the apparatus for developing the similar signals for magenta and cyan have identical circuit configuration and operation.

The signal $y_3$ from the special color computation circuit 2 is supplied to the (+) input terminal or additive input of Y amplifier 76, while the (−) input terminal or subtractive input of Y amplifier 76 is coupled to the output of Y generator 88. The signal $k_2$ from the special color computation circuit 2 is applied to the first input terminal of Y generator 88 through a potentiometer 91 so that a portion of signal $k_2$, depending upon the position of the adjustable contact of the potentiometer, is supplied to the Y generator 88 for developing the signal for under-color removal of yellow. A second input terminal of Y generator 88 connects with the lead 70 of the special color signal of orange $o_3$ through a potentiometer 92 so that a portion of signal $o_3$ is picked up by the Y generator 88 depending upon the position of the adjustable contact of potentiometer 92 for developing the signal for under-color removal of orange. The lead 74 of signal $g_3$ *is connected with a third input terminal of Y generator 88 through a potentiometer 93 for developing the signal for under-color removal of green. It is obvious that the violet signal* $v_3$ is not used for the computation in the yellow channel because they are complementary colors to each other. Thus, the signal from Y generator 88 is supplied to the (−) input terminal of Y amplifier 76 so that the amplifier amplifies a difference signal with the signal $y_3$. The difference signal $y_4$ is then appears the output lead 94 of Y amplifier 76 for representation as the signal of yellow ink required after under-color removal.

Similarly, the M generator 89 has three input terminals for receiving the signals $k_2$, $o_3$ and $v_3$ through potentiometers 95, 96 and 97, respectively. Depending upon the position of the adjustable contact of the respective potentiometer, signals are developed for under-color removal by black ink and by two colors of yellow and violet. The signal which has been derived by M generator is supplied to the (−) input terminal of M amplifier 78 as the subtractive input thereto so that the difference signal $m_4$ appears the output lead 98.

In the a same manner, the signals $k_2$, $g_3$ and $v_3$ are supplied to the three input terminals of C generator 90 through potentiometers 99, 100 and 101, respectively. The C generator 90 develops the signals, depending upon the position of the adjustable contact of the respective potentiometer, for deriving the difference signal $c_4$ from the output lead 102 of C amplifier 80.

The signals which are applied to Y generator 88 for developing special color signal of yellow, may be treated by a method of mean addition. However, a method of maximum valve selection is found advantageous for operation. As the method for selection of the maximum value from a plurality of signals is well known in the art, it is omitted to describe about such method in detail. The signal $y_4$ which appears the output lead 94 of Y amplifier 76, is represented by the following equation:

$$y_4 = y_3 - \text{MAX.}\ (U_{yk}k_3 U_{yo}o_3 U_{yg}g_3)$$

where the coefficients $U_{yk}$ $U_{yo}U_{yg}$ may be chosen optionally from the condition $O \leqq U_{yk}$ $U_{yo}$ $U_{yg} \leqq 1$, each being determined by the position of the adjustable contact of the corresponding potentiometer.

The computation for magenta and cyan inks are performed just as same as described above referring to the yellow ink.

The signal for black ink will not be treated as under-color removal. Thus there is no special treatment of black ink signal in the under-color removal circuit 3.

The signals which have been derived from the under-color removal circuit 3, may be represented by the following equations:

$$\begin{aligned} y_4 &= y_3 - \text{MAX.}\ (U_{yk}k_2 U_{yo}o_3 U_{yg}g_3) \\ o_4 &= o_3 - U_{ok}k_2 \\ m_4 &= m_3 - \text{MAX.}\ (U_{mk}k_2 U_{mv}v_3 U_{mo}o_3) \\ v_4 &= v_3 - U_{vk}k_2 \\ c_4 &= c_3 - \text{MAX.}\ (U_{ck}k_2 U_{cg}g_3 U_{cv}v_3) \\ g_4 &= g_3 - U_{gk}k_3 \\ k_3 &= k_2 \end{aligned} \qquad (5)$$

where U is chosen from $O \leqq U \leqq 1$.

The ink signals $y_4$, $o_4$, $m_4$, $v_4$, $c_4$, $g_4$, and $k_3$ are derived from the under-color removal circuit 3 through output leads 94, 85, 98, 86, 102, 87, and 103, respectively. These signals may be utilized to produce seven color-separation printers. The magnitude of each ink signal is determined in accordance with the following table, when it is substituted by the corresponding ink:

TABLE 2

| | Patches of used inks | | | | | | | |
|---|---|---|---|---|---|---|---|---|
| | Y | O | M | V | C | G | K | White |
| Ink signals: | | | | | | | | |
| $y_4$ | 1 | 0 | 0 | 0 | 0 | 0 | 0 | 0 |
| $o_4$ | 0 | 1 | 0 | 0 | 0 | 0 | 0 | 0 |
| $m_4$ | 0 | 0 | 1 | 0 | 0 | 0 | 0 | 0 |
| $v_4$ | 0 | 0 | 0 | 1 | 0 | 0 | 0 | 0 |
| $c_4$ | 0 | 0 | 0 | 0 | 1 | 0 | 0 | 0 |
| $g_4$ | 0 | 0 | 0 | 0 | 0 | 1 | 0 | 0 |
| $k_3$ | 0 | 0 | 0 | 0 | 0 | 0 | 1 | 0 |

In case an orange ink is not used for printing, the value on the lines $y_4$ *and* $m_4$ *of the column O in the above table* 2 must be 1. This setting may be carried out by potentiometers 92 and 96. For the under-color removal of orange, it is possible to perform its under-color removal in the range between 0 to 1 as described above.

While there has been described what is at present considered to be the preferred embodiment of the invention, it will be obvious to those skilled in the art that various changes and modifications may be made therein. For example, the equation (4) may be written, without addition of $k_1$, as under:

$$x_3 = x_2 \pm \Delta y_2 \pm \Delta m_2 \pm \Delta c_2 \pm \Delta o_2 \pm \Delta v_2 \pm \Delta g_2$$

And the $k_2$ is added to each of equations (5). And further, instead of the maximum value selection of three signals, the circuit may be changed to perform addition.

I claim:

1. Apparatus for the production of color-separation records for the reproduction of color images from a scanned original color copy comprising input terminals for supplying signals individually representative of the primary red, green, and blue color components of a scanned color copy, a basic computation circuit means coupled to said input terminals for deriving ink signals corresponding to a set of basic three primary color inks, three secondary color inks and a black ink individually representative of said set of color components and the neutral component of said scanned color copy, a special color computation circuit means having a plurality of circuit means individually coupled to the output terminals of said basic computation circuit means, each effective to correct said ink signals from said basic computation circuit means in accordance with the hue of the primary color inks and the intermediate color inks which are actually used for reproduction, and an under-color removal circuit means coupled to said special color computation circuit means for adjustably developing signals representative of the amount to be removed of the islands or dots in the color separation records of the basic three primary colors corresponding to the amounts of the signals for the intermediate colors and neutral gray derived from said special color computation circuit means.

2. Apparatus for the production of color separation records for the reproduction of color images from a scanned original color copy as claimed in claim 1, wherein the basic computation circuit means comprising a color correction circuit which develops ink signals corresponding to the standard inks for four-color halftone representative of yellow, magenta, cyan and black and a plurality of color computers individually deriving ink signals on the supposition that the color images of a scanned color copy are reproduced with the use of basic three primary color inks of yellow, magenta and cyan, basic three intermediate color inks of orange, violet and green and black ink additively.

3. Apparatus for the production of color separation records for the reproduction of color images from a scanned original color copy as claimed in claim 2, wherein the basic computation circuit means are provided with a plurality of color computers each having the differential amplifier for deriving the signals in the equations:

$$y_2 = y_1 - k_1$$
$$m_2 = m_1 - k_1$$
$$c_2 = c_1 - k_1$$

where $y_1$, $m_1$, $c_1$, and $k_1$ are the ink signals for yellow, magenta, cyan and black, respectively, derived from the color correction circuit, and $y_2$, $m_2$ and $c_2$ are corrected ink signals for yellow, magenta and cyan, respectively, appeared the output terminals of said basic computation circuit means, and for deriving the signals for orange, violet and green inks in the equations:

$$o_2 = \text{MIN. } (y_2 \text{ or } m_2)$$
$$v_2 = \text{MIN. } (m_2 \text{ or } c_2)$$
$$g_2 = \text{MIN. } (c_2 \text{ or } y_2)$$

where $o_2$, $v_2$ and $g_2$ appear the output terminals of said basic computation circuit means as the signals representative of the amount of the overprinting inks which may be substituted by the secondary color inks.

4. Apparatus for the production of color separation records for the reproduction of color images from a scanned original color copy as claimed in claim 1, wherein the special color computation circuit means comprising a plurality of color computer units each having a set of potentiometers and a differential amplifier for deriving the signals in the equations:

$$x_3 = k_1 + x_2 \pm \Delta y_2 \pm \Delta m_2 \pm \Delta c_2 \pm \Delta o_2 \pm \Delta v_2 \pm \Delta g_2$$
$$k_2 = k_1 \pm \Delta y_2 \pm \Delta m_2 \pm \Delta c_2 \pm \Delta o_2 \pm \Delta v_2 \pm \Delta g_2$$

where $x_2$ is the color component signal derived from the basic computation circuit means, $x_3$ is the special color signal, and the letter $x$ is read to anyone of $y$, $m$, $c$, $o$, $v$, and $g$, and $k_2$ is the neutral component corrected to the ink used actually for printing.

5. Apparatus for the production of color separation records for the reproduction of color images from a scanned original color copy as claimed in claim 1, wherein the under-color circuit means are provided with a plurality of amplifiers each effective to develop the signals in the equations:

$$o_4 = o_3 - U_{ok}k_2$$
$$v_4 = v_3 - U_{vk}k_2$$
$$g_4 = g_3 - U_{gk}k_2$$

where $U_{ok}$, $U_{rk}$ and $U_{gk}$ refer to optional values of $O \leqq U_{ok} \leqq 1$, $O \leqq U_{rk} \leqq 1$ and $O \leqq U_{gk} \leqq 1$, respectively, which are determined by the value of signal $k_2$ to be fed to the respective amplifier as the subtractive input thereof, for developing the signals for under-color of orange, violet and green; and said under-color removal circuit means are further provided with a set of signal generators and amplifiers each effective to develop the signals in the equations:

$$y_4 = y_3 - \text{MAX. } (U_{yk}k_2 U_{yo}o_3 U_{yg}g_3)$$
$$m_4 = m_3 - \text{MAX. } (U_{mk}k_2 U_{mv}v_3 U_{mo}o_3)$$
$$c_4 = c_3 - \text{MAX. } (U_{ck}k_2 U_{cg}g_3 U_{cv}v_3)$$

where $U_{yk}$, $U_{yo}$, $U_{yg}$, $U_{mk}$, $U_{mr}$, $U_{mo}$, $U_{ck}$, $U_{cg}$, $U_{cr}$ are the inputs of the respective signal generator under the condition of $O \leqq U \leqq 1$, and the output of said signal generator is applied to the respective amplifier as the subtractive input thereof for developing the signals for under-color operation of yellow, magenta and cyan.